United States Patent [19]
Tomimatsu et al.

[11] Patent Number: 5,902,380
[45] Date of Patent: May 11, 1999

[54] DUST COLLECTOR

[75] Inventors: Kazutaka Tomimatsu; Yasutoshi Ueda, both of Kobe, Japan

[73] Assignee: Mitsubishi Heavy Industries, Ltd., Tokyo, Japan

[21] Appl. No.: 08/862,268

[22] Filed: May 23, 1997

[30] Foreign Application Priority Data

| May 23, 1996 | [JP] | Japan | 8-128374 |
| Oct. 16, 1996 | [JP] | Japan | 8-273549 |
| Apr. 10, 1997 | [JP] | Japan | 9-092367 |

[51] Int. Cl.⁶ .................................................. B03C 3/014
[52] U.S. Cl. .......................... 96/27; 95/71; 96/53; 96/66; 96/69; 96/74; 96/87
[58] Field of Search .................................. 96/27, 52, 53, 96/74, 66, 69, 87; 95/58, 61, 62, 71, 72, 64–66

[56] References Cited

U.S. PATENT DOCUMENTS

| 2,357,354 | 9/1944 | Penney | 96/27 |
| 2,357,355 | 9/1944 | Penney | 96/27 |
| 2,525,347 | 10/1950 | Gilman | 96/27 X |
| 2,788,081 | 4/1957 | Ransburg | 96/27 |
| 3,440,799 | 4/1969 | Romell | 96/27 |
| 3,681,896 | 8/1972 | Velkoff | 96/27 |
| 3,729,898 | 5/1973 | Richardson | 96/27 X |
| 3,807,137 | 4/1974 | Romell | 96/27 X |
| 3,958,958 | 5/1976 | Klugman et al. | 95/64 |
| 4,029,482 | 6/1977 | Postma et al. | 95/58 |
| 4,541,844 | 9/1985 | Malcolm | 95/64 |
| 4,619,670 | 10/1986 | Malcolm et al. | 96/27 |

FOREIGN PATENT DOCUMENTS 892908  4/1962  United Kingdom.

*Primary Examiner*—Richard L. Chiesa
*Attorney, Agent, or Firm*—Foley & Lardner

[57] ABSTRACT

A dust collector efficiently collects dust, especially fine dust (submicron particles). The dust collector, which removes dust and/or mist contained in a gas, includes a charger for charging the dust and/or mist contained in a gas, a sprayer for spraying the charged dust or charged mist or spraying a dielectric material to the charged dust or mist, an electric field former for forming an electric field for subjecting the dielectric material to dielectric polarization, and a collector for collecting the dielectric material which has arrested the charged dust and/or the charged mist.

11 Claims, 11 Drawing Sheets

DUST COLLECTOR

FIELD OF THE INVENTION

The present invention relates to a dust collector and, more particularly, to a dust collector which collects fine dust with high efficiency.

BACKGROUND OF THE INVENTION

Conventionally, an industrial electric dust collector is constructed so that dust in a gas is charged by ions formed in corona discharge and is collected on a collecting electrode by the Coulomb force. The collector is mainly composed of a d.c. high-voltage power source, discharge electrode, and collecting electrode, and corona discharge is effected by applying a high voltage of about several tens of kilovolts to the discharge electrode. Before dust is collected, the dust must be moved over the distance to the collecting electrode.

For the electric dust collector, dust is collected by moving dust carrying an electric charge by receiving the Coulomb force in an electric field. The travel velocity is determined by the amount of charge on the dust, electric field strength, air resistance, etc., and in consequence, the particle travel velocity is lowest for fine dust, especially for submicron dust.

The dust collecting efficiency $\eta$ in the electric dust collector is approximately expressed by $\eta = 1 - e^{-WA/Q}$ (where, W is dust travel velocity, A is area of collecting electrode, and Q is the amount of gas). Therefore, the only means for collecting submicron particles with a low travel velocity with high efficiency is to increase the area of the collecting electrode, which requires a large apparatus, resulting in high cost.

The problem is that dust with a low travel velocity must be moved over a long distance which corresponds to the space between the electrodes and which is several centimeters on average. On the other hand, if dust can be somehow collected with high efficiency even in the case of short travel distances, the efficient collection of submicron particles becomes possible with a small-sized apparatus.

A possible solution to the above problem is a reduction of the space between the discharge and collecting electrodes or narrow spacing. In this case, however, because the contamination of electrodes greatly affect the charging characteristics the performance may even deteriorate, or because the number of electrodes has to be increased, it does not lead to cost reductions.

SUMMARY OF THE INVENTION

An object of the present invention is to provide a dust collector which can efficiently collect submicron particles that have difficulty being collected by the conventional electric dust collector.

The present invention provides a dust collector for removing dust and/or mist contained in a gas, comprising: charging means for electrically charging dust and/or mist contained in a gas; spraying means for spraying a dielectric material to the charged dust and/or mist; electric field forming means for forming an electric field for subjecting said dielectric material to dielectric polarization; and collecting means for collecting said dielectric material which has arrested at least either of the charged dust and charged mist.

The present invention also provides a dust collector comprising: cooling means for cooling a gas so as to form a mist of a gas component to be removed from said gas; charging means for electrically charging said mist; spraying means for spraying a dielectric material to the charged mist; electric field forming means for forming an electric field for subjecting said dielectric material to dielectric polarization; and collecting means for collecting said dielectric material which has arrested the charged mist.

Further, the present invention provides a dust collector for removing dust and/or mist contained in a gas, comprising: charging means for electrically charging dust and/or mist contained in a gas; spraying means for spraying a dielectric material to the charged dust and/or mist; electric field forming means for forming an electric field for subjecting said dielectric material to dielectric polarization; and a porous or mesh-form, non-conductive member for holding the dielectric material which member is arranged so as to block the travel path of said dielectric material in said electric field.

DETAILED DESCRIPTION OF PREFERRED EMBODIMENTS

Dust collectors in accordance with the present invention will be described in detail with reference to the accompanying drawings.

Figure 1:
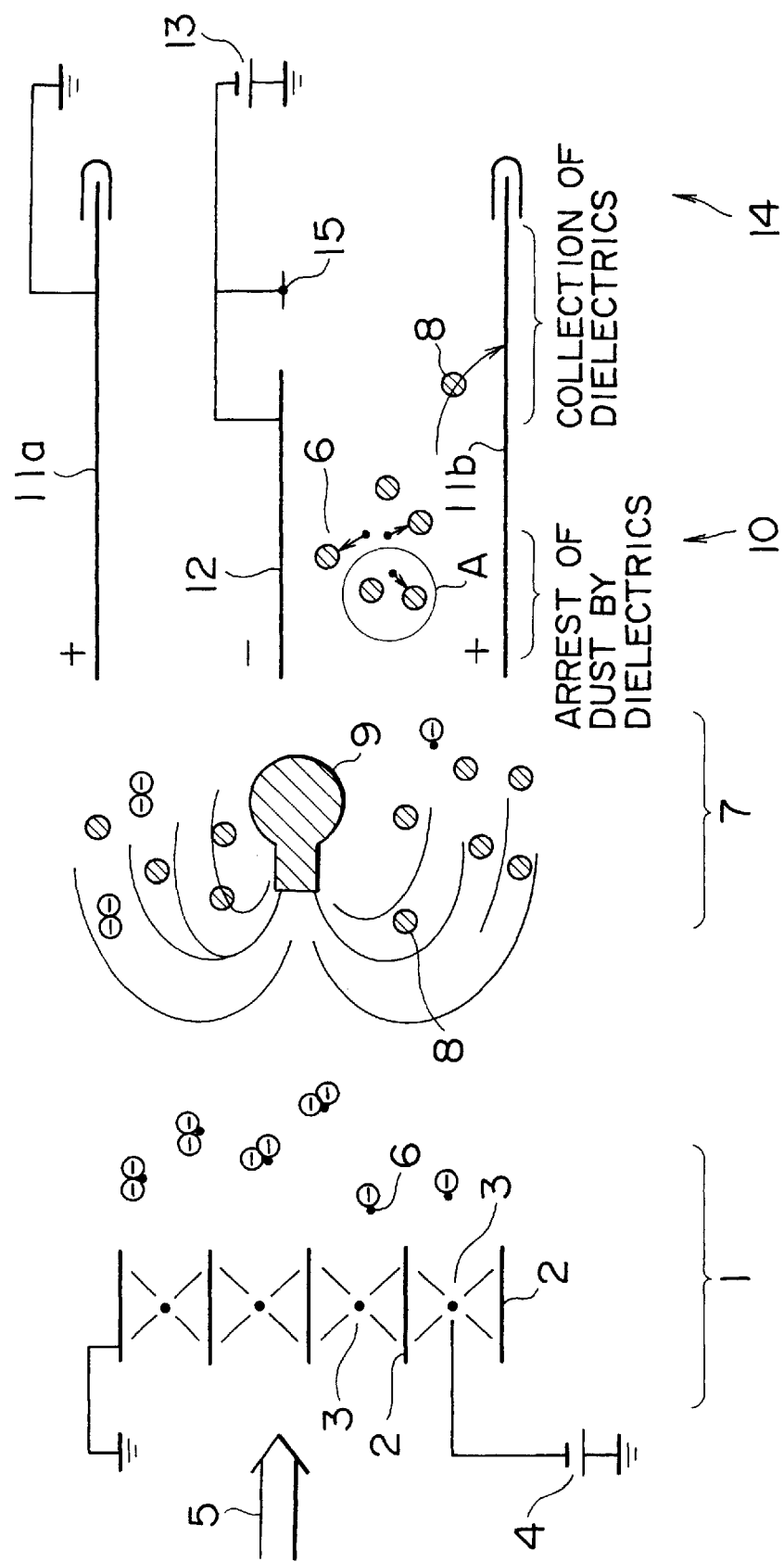
FIG. 1 is a schematic plan view of a dust collector in accordance with working example 1 of the present invention.
Figure 2:
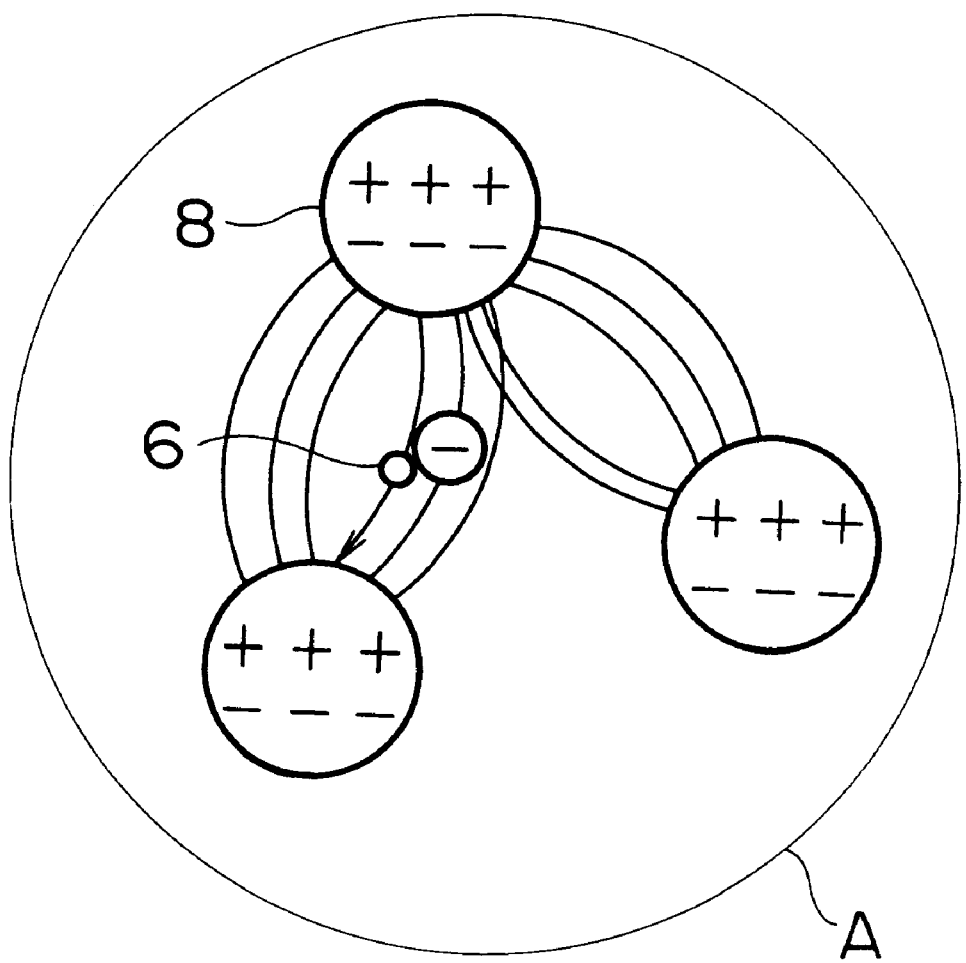
FIG. 2 is an enlarged view of portion A in FIG. 1.
Figure 3:
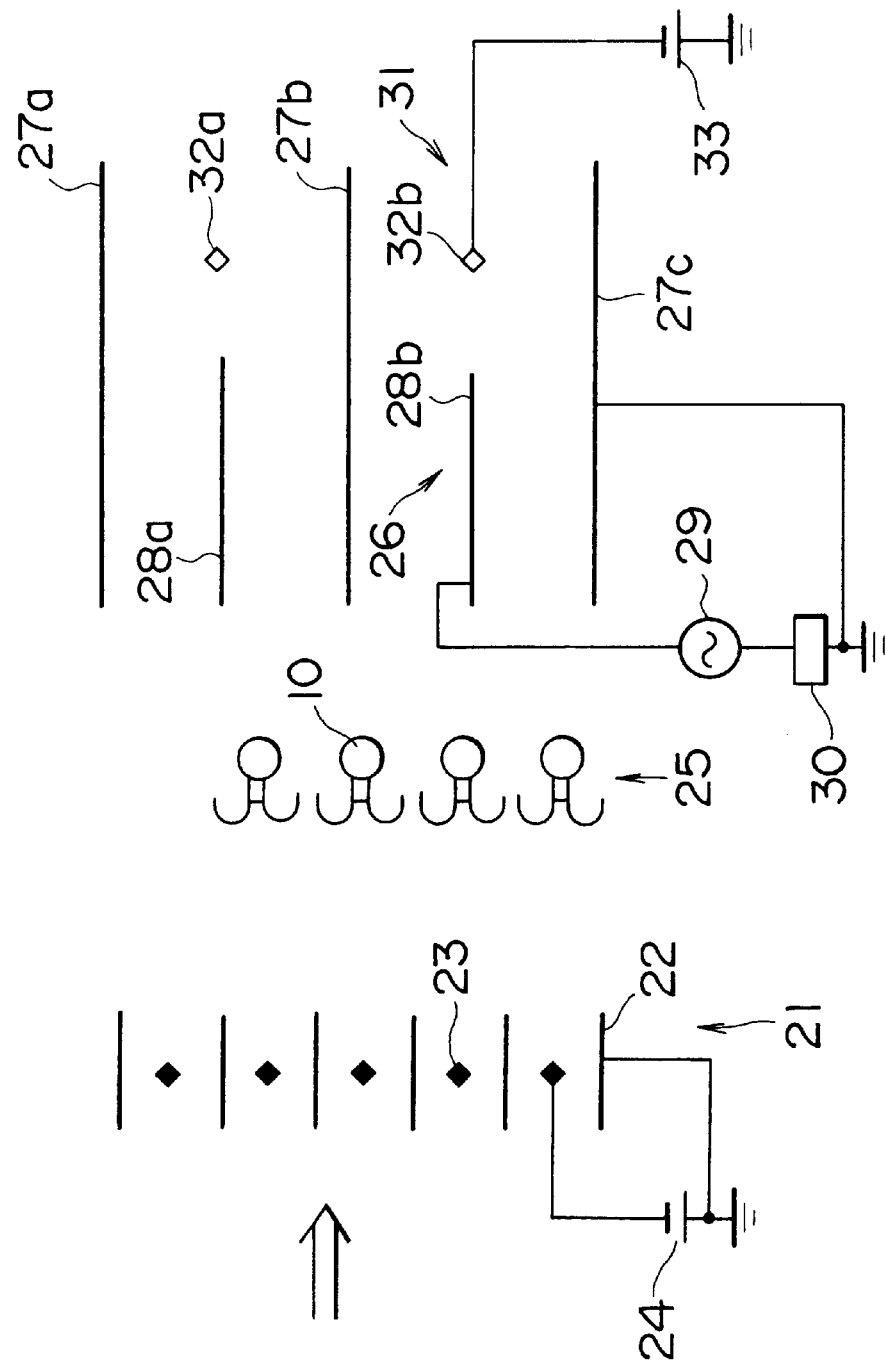
FIG. 3 is a schematic plan view of a dust collector in accordance with working example 2 of the present invention.
Figure 4:
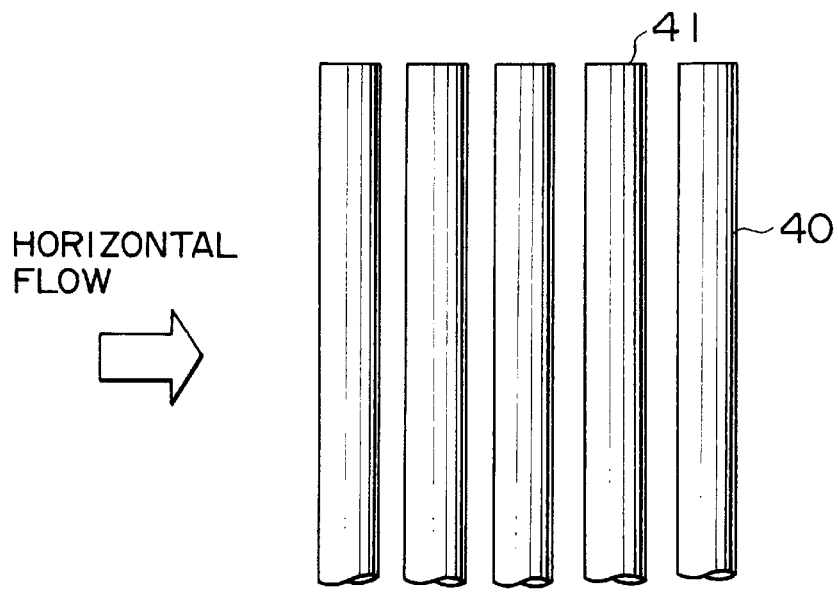
FIG. 4 is a side view showing grounding electrodes and voltage applying electrodes of electric field forming means of a dust collector in accordance with working example 3 of the present invention.
Figure 5:
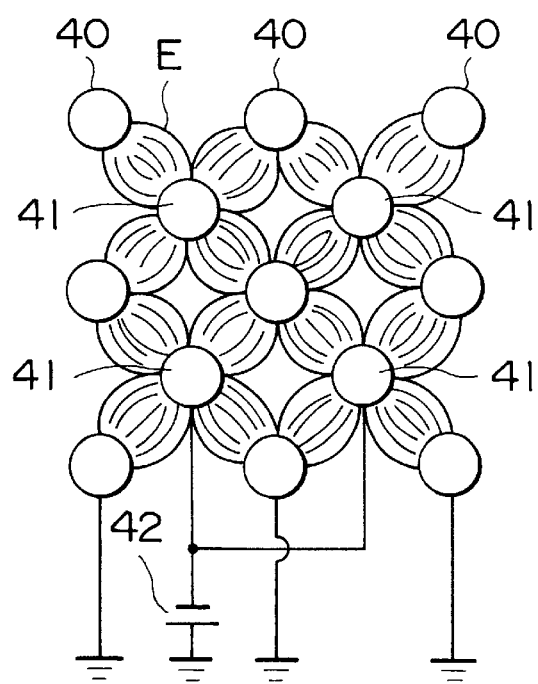
FIG. 5 is a plan view showing the grounding electrodes and voltage applying electrodes shown in FIG. 4.
Figure 6:
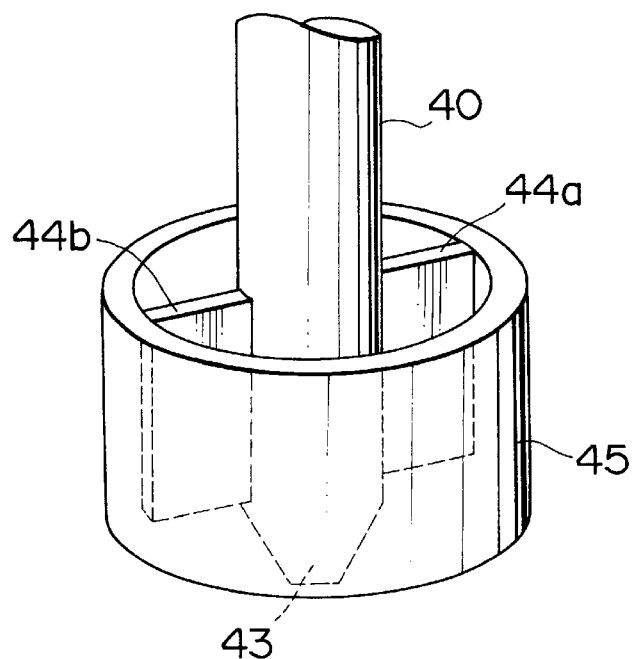
FIG. 6 is an enlarged view showing a lower part of the grounding electrode shown in FIG. 4.
Figure 7:
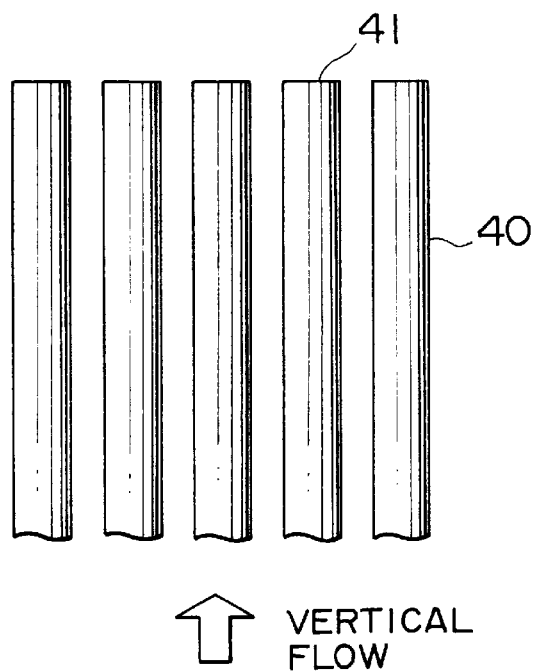
FIG. 7 is a side view for illustrating a case where dielectrics and dust are moved to the field forming means as a vertical flow in the dust collector in accordance with working example 3 of the present invention.
Figure 8:
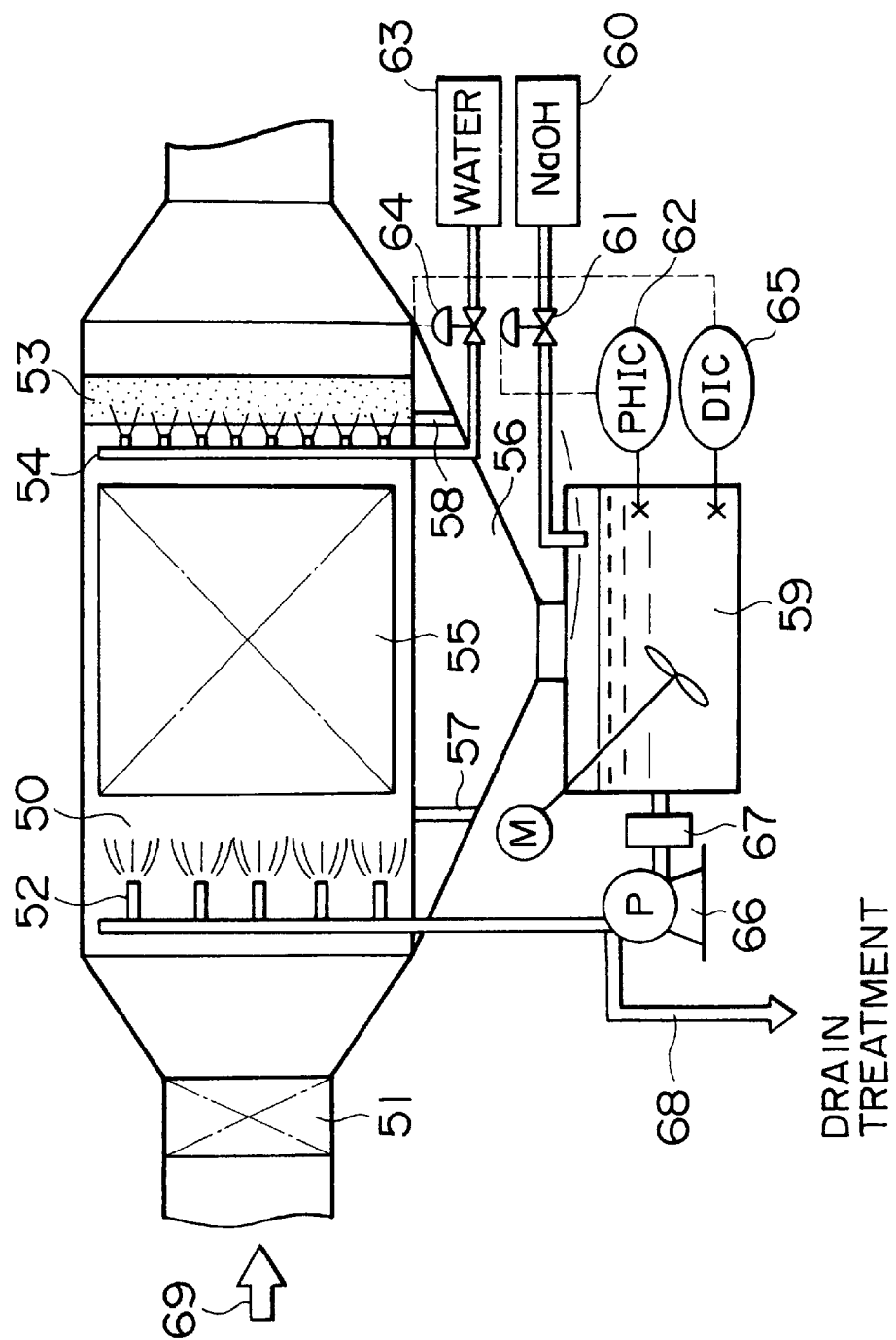
FIG. 8 is a schematic sectional view of a dust collector in accordance with working example 4 of the present invention.
Figure 9:
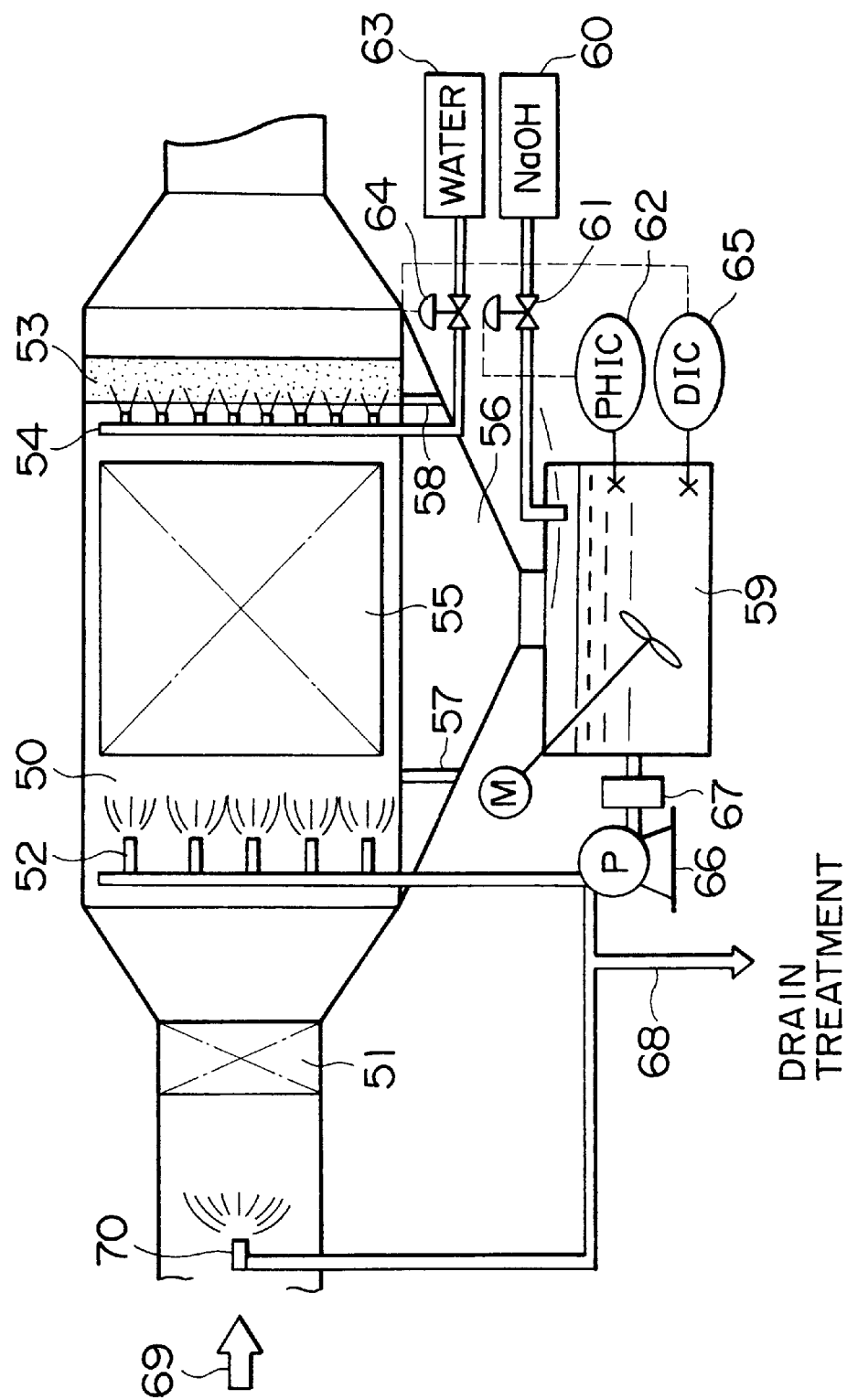
FIG. 9 is a schematic sectional view of a dust collector in accordance with working example 5 of the present invention.
Figure 10:
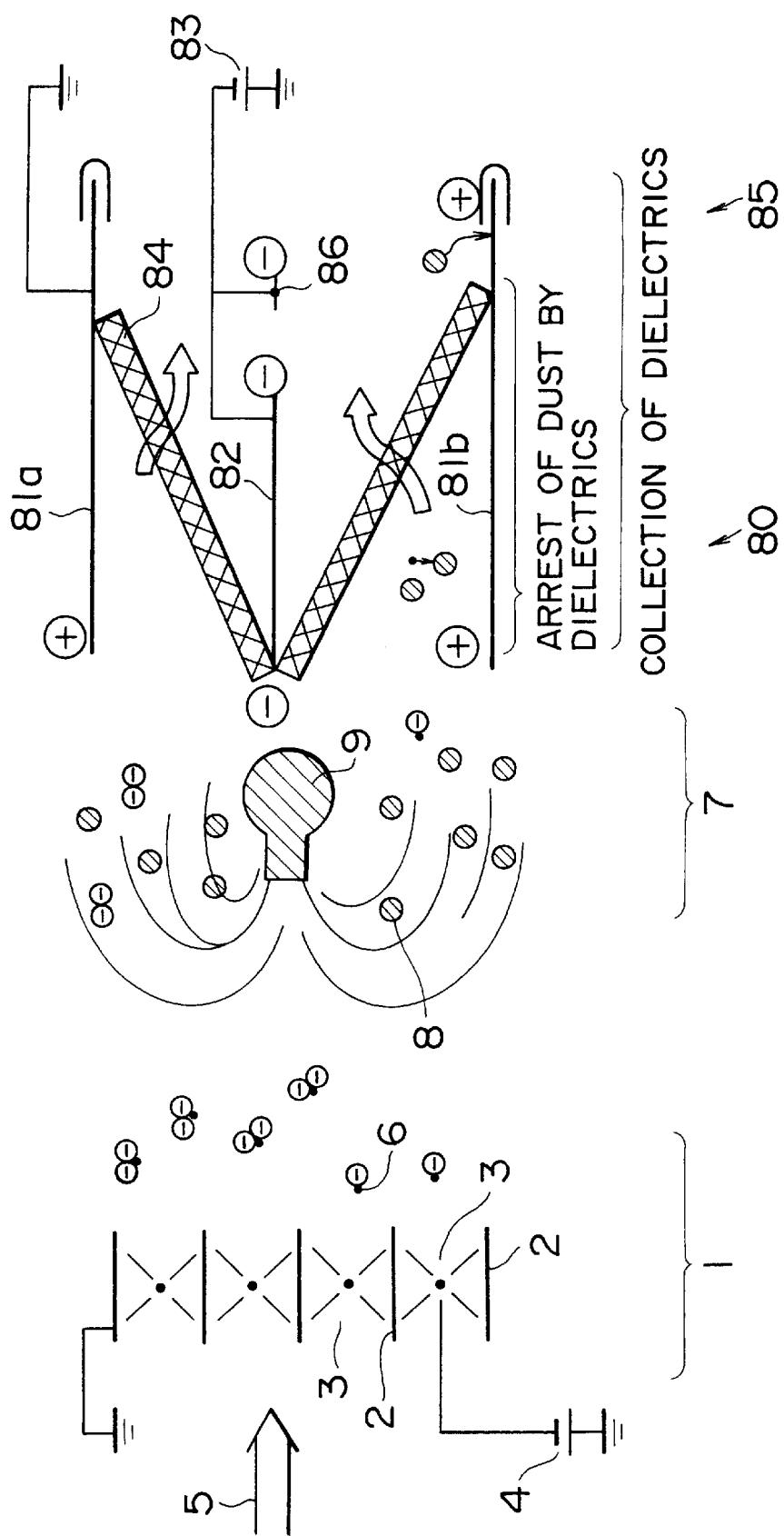
FIG. 10 is a schematic plan view of a dust collector in accordance with working example 6 of the present invention.
Figure 11:
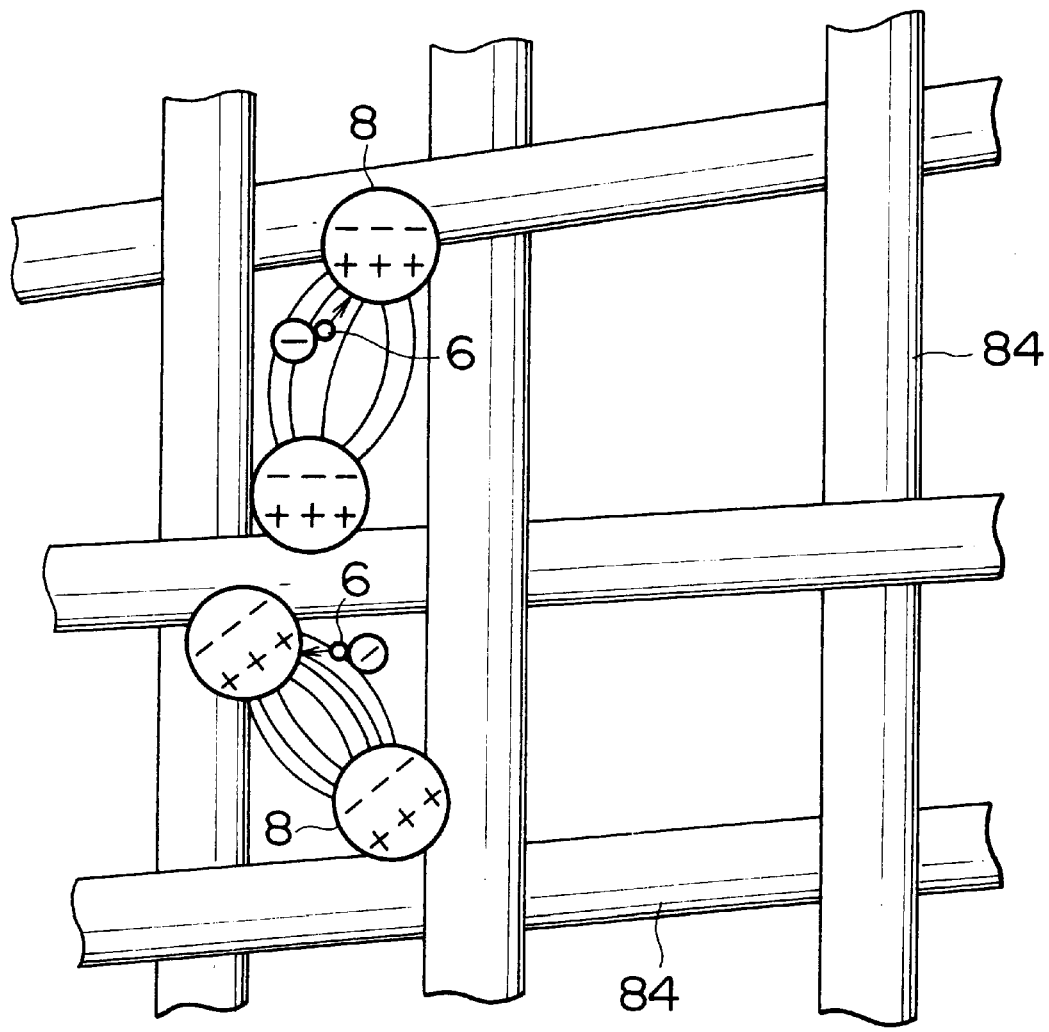
FIG. 11 is a schematic view for illustrating the operation in the dust collector in accordance with working example 6 of the present invention.
Figure 12:
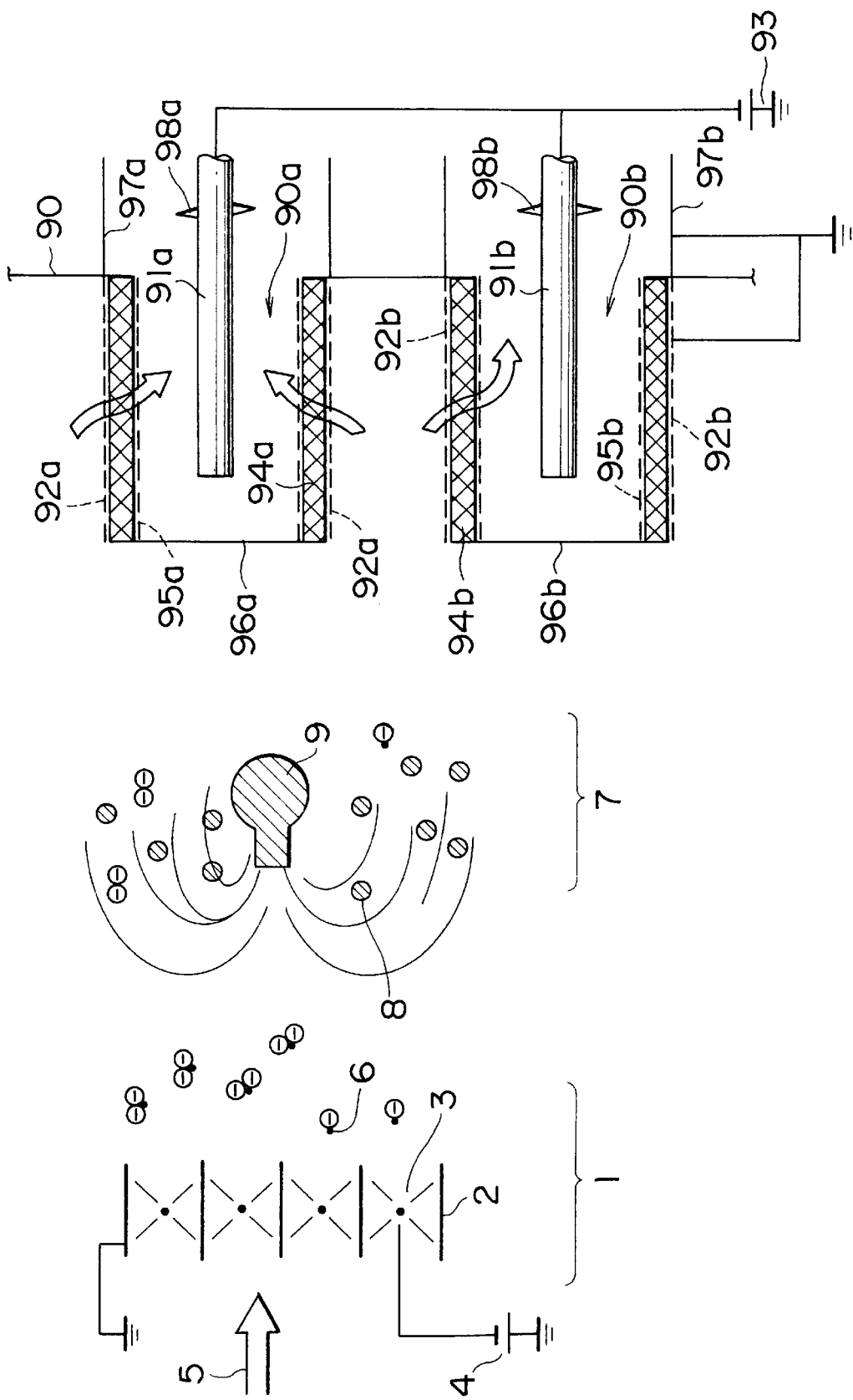
FIG. 12 is a schematic plan view of a dust collector in accordance with working example 7 of the present invention.
Figure 13:
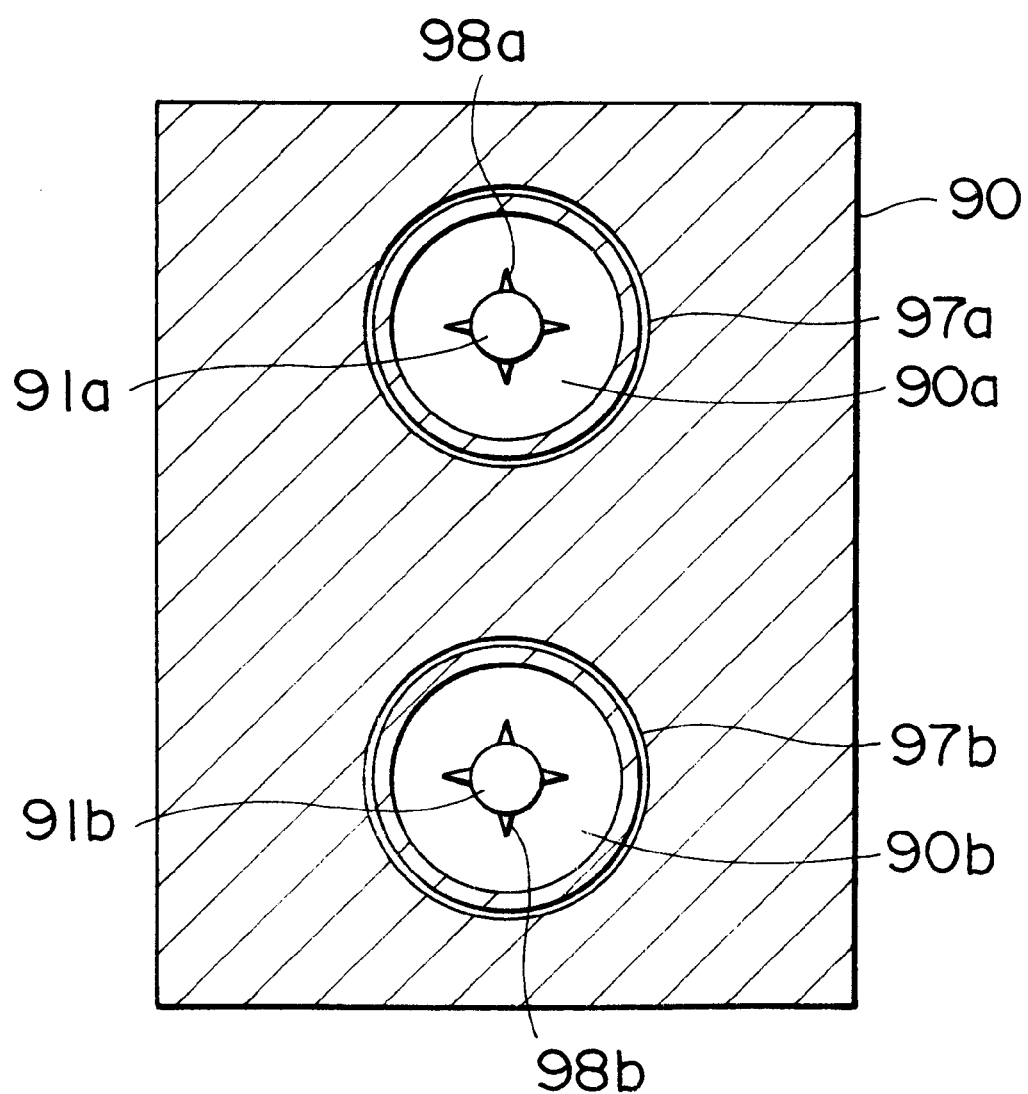
FIG. 13 is a front view showing the electric field forming means shown in FIG. 12.

FIG. 1 is a schematic plan view of a dust collector in accordance with working example 1 of the present invention, FIG. 2 is an enlarged view of portion A in FIG. 1, FIG. 3 is a schematic plan view of a dust collector in accordance with working example 2 of the present invention, FIG. 4 is a side view showing grounding electrodes and voltage applying electrodes of electric field forming means of a dust collector in accordance with working example 3 of the present invention, FIG. 5 is a plan view showing the grounding electrodes and voltage applying electrodes shown in FIG. 4, FIG. 6 is an enlarged view showing a lower part of the grounding electrode shown in FIG. 4, FIG. 7 is a side view for illustrating a case where dielectrics and dust are moved to the field forming means as a vertical flow in the dust collector in accordance with working example 3 of the present invention, FIG. 8 is a schematic sectional view of a dust collector in accordance with working example 4 of the present invention, FIG. 9 is a schematic sectional view of a dust collector in accordance with working example 5 of the present invention, FIG. 10 is a schematic plan view of a dust collector in accordance with working example 6 of the present invention, FIG. 11 is a schematic view for illustrating the operation in the dust collector in accordance with working example 6 of the present invention, FIG. 12 is a schematic plan view of a dust collector in accordance with working example 7 of the present invention; and FIG. 13 is a front view showing the electric field forming means shown in FIG. 12 (viewed from an outlet-side duct).

WORKING EXAMPLE 1

As shown in FIG. 1, charging means 1 comprises a plurality of (for example, five) opposing electrodes 2 arranged at equal intervals, a plurality of (for example, four) discharge electrodes 3 arranged between the opposing electrodes 2, and a high voltage developing device 4 connected to the discharge electrodes 3. The opposing electrodes 2 are grounded. A gas to be treated (for example, exhaust gas generated when coal, heavy oil, etc. are burned) is carried to this charging means 1. When a high voltage of, for example, a negative value is applied to the discharge electrodes 3 by the high voltage developing device 4, corona discharge takes place, so that negative unipolar ions are produced. Dust 6 in the gas 5 can be electrically charged by these ions.

The dust 6 charged negative is carried to spraying means 7 (spray portion). The spraying means 7 has a nozzle 9 for spraying dielectrics 8 to the dust 6. From this nozzle 9 of the spraying means 7, water, for example, is sprayed as the dielectrics 8 to the dust 6 in a mist form. The diameter of particle from the nozzle 9 should preferably be several tens of microns to several millimeters. The spray amount of the dielectrics 8 should be changed according to the concentration of the dust 7. Further, the dielectrics 8 should be sprayed uniformly to the dust 6.

The dielectrics 8 and dust 6 are carried to electric field forming means 10. The electric field forming means 10 uses parallel plate electrodes. Specifically, the electric field forming means 10 comprises two grounding electrodes 11a and 11b arranged a desired distance apart from each other, a voltage applying electrode 12 arranged between the upstream-side parts of the grounding electrodes 11a and 11b, and a direct current ("d.c.") power source 13 whose negative side is connected to the voltage applying electrode 12 and positive side is grounded. The two grounding electrodes 11a and 11b are grounded. In this electric field forming means 10, when a d.c. voltage is applied to the voltage applying electrode 12 by the d.c. power source 13, a d.c. electric field can be formed in a space surrounded by the grounding electrode 11a and the voltage applying electrode 12 and a space surrounded by the grounding electrode 11b and the voltage applying electrode 12, so that the dielectrics 8 existing in these spaces can be subjected to dielectric polarization. The strength of the electric field (average electric field strength) is set at 5 kV/cm, for example. The formation of electric field by using parallel plate electrodes in this manner is desirable because a uniform electric field can be obtained. The dielectrics 8 subjected to dielectric polarization can arrest the aforesaid dust 6 charged negative by the Coulomb force as shown in FIG. 2, for example.

In the uniform electric field, since the dielectrics 8 are only subjected to dielectric polarization, most dielectrics 8 except those existing near the electrode plate are not collected on the electrode, and drift about. As the amount of the drifting dielectrics 8 existing in the electric field increases, the space between the dielectrics 8 is shortened, and the dielectrics 8 are polarized with each other to form a complicated electric field. Thereupon, the polarization charge of the dielectrics 8 and the charge of the dust 6 can be attracted to each other in a range of very short distance, and the Coulomb force acts on the charged dust 6 in the electric field, so that the dust 6 can easily be stuck on the dielectrics 8. If the mean free path for colliding the dust 6 with the dielectrics 8 is several millimeters or less, the dust 6 can be stuck on the dielectrics 8 very efficiently.

The dielectrics 8 that have arrested the dust 6 in such a manner are carried to collecting means 14. The collecting means 14 has a discharge electrode 15 connected to a path branching off from an electric current path formed between the voltage applying electrode 12 and the d.c. power source 13. By this configuration, portions opposing to the discharge electrode 15 of the two grounding electrodes 11a and 11b are used as an electric dust collector. According to this collecting means 14, when a d.c. voltage is applied to the discharge electrode 15 by the d.c. power source 13, corona discharge can be allowed to take place between the grounding electrode 11a and the discharge electrode 15 and between the grounding electrode 11b and the discharge electrode 15. As described above, the dielectrics 8 are water mist, for example, which has a particle diameter larger than that of the dust 6, so that the dielectrics 8 that have arrested the dust 6 can easily be collected on the downstream portions of the voltage applying electrode 12 of the two grounding electrodes 11a and 11b. Also, the distance at which the dust is arrested by water mist, which distance is determined by the amount and diameter of water mist, is several millimeters, for example. It is necessary only that the dust 6 is moved this distance. Therefore, the dust collecting efficiency, especially the efficiency of collecting dust of submicron particle diameter, can be improved significantly as compared with the case where dust is moved several centimeters to several tens of centimeters as before. Further, the size of grounding electrode necessary for collecting dust can be decreased remarkably as compared with the case where dust is collected by the electric dust collector alone, so that the dust collector can be made small. Also, since the charging means merely gives electric charge to dust, high flow rate can be achieved. Further, since it is necessary only that the electric field forming means provides a uniform electric field, the space between the electrodes can be increased.

WORKING EXAMPLE 2

By using a dust collector shown in FIG. 3, dust in treated gas of the same kind as described in the above-mentioned working example 1 was removed.

As shown in FIG. 3, charging means 21 comprises a plurality of (for example, six) opposing electrodes 22 arranged at equal intervals, a plurality of (for example, five)

discharge electrodes 23 arranged between the opposing electrodes 22, and a high voltage developing device 24 whose minus side is connected to the discharge electrodes 23 and plus side is grounded. The electric current path for grounding the high voltage developing device 24 branches off and is connected to the opposing electrodes 22. When the aforesaid treated gas is carried to this charging means 21, and a high voltage of, for example, minus is applied to the discharge electrodes 23 by the high voltage developing device 24, corona discharge takes place, so that negative unipolar ions are produced. Dust in the treated gas can be charged by these ions.

The dust charged negative is carried to spraying means 25 (spray portion). The spraying means 25 has a plurality of (for example, four) nozzles 10 having the same configuration as that of the nozzle used in the above-mentioned working example 1. From these nozzles 10 of the spraying means 25, water mist, for example, is sprayed as the dielectrics to the dust.

The dielectrics and dust are carried to electric field forming means 26. The electric field forming means 26 uses parallel plate electrodes. Specifically, the electric field forming means 26 comprises three grounding electrodes 27a, 27b, and 27c arranged at equal intervals, a first voltage applying electrode 28a arranged between the grounding electrode 27a and the grounding electrode 27b so as to oppose to the upstream part of respective grounding electrodes, a second voltage applying electrode 28b arranged between the grounding electrode 27b and the grounding electrode 27c so as to oppose to the upstream part of respective grounding electrodes, a power source 29 connected to the first voltage applying electrode 28a and the second voltage applying electrode 28b, and an inverter 30 for selecting the power source frequency.

In this electric field forming means 26, when the power source 29 is turned on, the power source frequency is selected by the inverter 30, and an alternating current ("a.c.") voltage of a desired frequency is applied to the first and second voltage applying electrodes 28a and 28b, an alternating electric field can be formed in a space surrounded by the three grounding electrodes 27a to 27c and the first and second voltage applying electrodes 28a and 28b, so that the dielectrics existing in this space can be subjected to dielectric polarization. The strength of the electric field (average electric field strength) is set at 5 kV/cm, for example. The dielectrics subjected to dielectric polarization can arrest the dust charged negative by the Coulomb force. Since water mist, for example, is used as the dielectrics, the particle diameter of the dielectrics can be made several orders of magnitude larger than that of the dust. Therefore, by selecting the frequency of a.c. voltage applied to the voltage applying electrodes, only the charged dust can be moved without moving the dielectrics, so that the dust arresting percentage of the dielectrics can be improved. The formation of an alternating electric field by the parallel plate electrodes is preferable because a uniform electric field can be obtained.

The dielectrics that have arrested dust in this manner are carried to collecting means 31. The collecting means 31 comprises a first discharge electrode 32a arranged on the downstream side of the voltage applying electrode 28a between the grounding electrode 27a and the grounding electrode 27b, a second discharge electrode 32b arranged on the downstream side of the voltage applying electrode 28b between the grounding electrode 27b and the grounding electrode 27c, and a d.c. high voltage developing device 33 for applying a d.c. high voltage to the first and second discharge electrodes 32a and 32b. By this configuration, portions opposing to the discharge electrode 32a of the grounding electrodes 27a and 27b and portions opposing to the discharge electrode 32b of the grounding electrodes 27b and 27c are used as an electric dust collecting device.

According to this collecting means 33, corona discharge can be allowed to take place between the grounding electrode 27a, 27b and the discharge electrode 32a and between the grounding electrode 27b, 27c and the discharge electrode 32b by applying d.c. voltage to the discharge electrodes 32a and 32b by means of the d.c. high voltage developing device 33, so that the dielectrics that have arrested dust can easily be collected on the right-side portions of the three grounding electrodes 27a to 27c, resulting in improved dust collecting efficiency.

In working examples 1 and 2, examples in which an electric dust collector is used as collecting means have been explained. However, it was found that by using a demister as collecting means, the dielectrics that have arrested dust can easily be collected by the demister, and fine dust can be collected with high efficiency even by using a demister as collecting means.

WORKING EXAMPLE 3

Dust in a treated gas (for example, exhaust gas generated when coal, heavy oil, etc. are burned) was removed by a dust collector that is the same as that of working example 1 except that the electric field forming means and the collecting means are configured as described below.

The electric field forming means, which is also used as the collecting means, comprises a plurality of (for example, nine) cylindrical tube shaped grounding electrodes 40 and a plurality of (for example, four) cylindrical tube shaped voltage applying electrodes 41, as shown in FIGS. 4 and 5. The four voltage applying electrodes 41 are arranged so that a figure having these electrodes as vertices is a square. The nine grounding electrodes 40 are arranged so as to surround the four sides of each of the voltage applying electrodes 41. In other words, the grounding electrodes 40 and the voltage applying electrodes 41 are arranged in a zigzag lattice form. The minus side of a d.c. power source 42 is connected to the voltage applying electrodes 41, and the plus side thereof is grounded.

Each of the grounding electrodes 40 is tapered at its lower end, and formed with a restricted portion 43, as shown in FIG. 6. The grounding electrode 40 has a cylindrical tube shaped cover 45 which is made of a conductive material and formed with two support plates 44a and 44b on the inside thereof. The two support plates 44a and 44b are fixed to portions of the electrode 40 above the restricted portion 43 by welding, for example. By this configuration, the lower end of the grounding electrode 40 can be covered with the cover 45 having the same electric potential as that of the electrode. The grounding electrode 40 and the cover 45 should be formed of a conductive and acid-resisting material such as fiber-glass reinforced plastics having conductivity and stainless steel.

Each of the voltage applying electrodes 41 is, like the aforesaid grounding electrode 40, tapered at its lower end, and formed with a restricted portion. The voltage applying electrode has the same cover as that for the grounding electrode 40. Specifically, the cover is in a cylindrical tube shape, made of a conductive material, and formed with a plurality of (for example, two) support plates on the inside thereof. The two support plates are fixed to portions of the electrode 41 above the restricted portion by welding, for example. By this configuration, the lower end of the grounding electrode 41 can be covered with the cover having the same electric potential as that of the electrode. The voltage applying electrode 41 and the cover should be formed of the same material as that for the grounding electrode 40. Just under the grounding electrode and the voltage applying electrode, a dielectrics recovering vessel (not shown) such as a tank and a hopper is disposed.

In the electric field forming means, which is also used as collecting means, when a d.c. voltage is applied to each of the four voltage applying electrode 41 by the d.c. power source 42, power lines E can be produced between the grounding electrode 40 and the voltage applying electrode 41 as shown in FIG. 5, so that a nonuniform electric field can be formed between the electrodes. The strength of the electric field (average electric field strength) was set at 5 kV/cm.

According to the dust collector of this configuration, dust in the treated gas is charged, for example, negative by the charging means, and carried to the spraying means, where water mist, for example, is sprayed as dielectrics to the dust by the spraying means. The dielectrics and the dust are carried to the electric field forming means, which is also used as the collecting means, and moved as a horizontal flow in a space surrounded by the grounding electrode 40 and the voltage applying electrode 41. Specifically, the dielectrics and the dust move across the power lines E produced between the grounding electrode 40 and the voltage applying electrode 41. Thereupon, the dielectrics are subjected to dielectric polarization by the nonuniform electric field formed between the grounding electrode 40 and the voltage applying electrode 41, and the dust is arrested by the dielectrics subjected to dielectric polarization. Since the formed electric field is a nonuniform electric field, the electric field near the grounding electrode 40 and the voltage applying electrode 41 is high. As a result, the dielectrics that have arrested dust can be collected on the grounding electrode 40 by the gradient force, and the excess dielectrics are collected on the grounding electrode 40 and the voltage applying electrode 41.

Since the dielectrics are a liquid, for example, as described above, they flow down along the electrode when being collected on the electrode, and recovered in the aforesaid recovering vessel. When the dielectrics have conductivity or low resistance like water mist, the dielectrics collected on the electrode are subjected to dielectric polarization and charged inversely, and sometimes attracted to the opposing electrode. If such a phenomenon occurs, it becomes possibly difficult to apply a sufficient magnitude of voltage to the voltage applying electrode 41. This inverse charging phenomenon occurs remarkably at the lower end portion where the electric field is made strong by the edge effect. Since the restricted portion of the grounding electrode 40 is covered with a cover having the same electric potential as that of the electrode, and the restricted portion of the voltage applying electrode 41 is covered with a cover having the same electric potential as that of the electrode, the electric fields formed at the lower part of these electrodes are prevented from being made strong by the edge effect. Therefore, when the dielectrics collected on the grounding electrode 40 or the voltage applying electrode 41 drop along the electrode, the dielectrics are prevented from being charged inversely, so that the occurrence of spark can be restrained. Accordingly, although the formed electric field itself, which is a nonuniform electric field, has a somewhat low dust collecting efficiency as compared with the uniform electric field, a high voltage can be applied as compared with the uniform electric field, and the spray amount of dielectrics can be increased, resulting in improved dust collecting efficiency.

The dust collecting efficiency increases because the distance between the dielectrics and the dust decreases as the spray amount of dielectrics increases. In the case where a liquid such as water mist is used as the dielectrics, and the electric field forming means is constructed by parallel plane electrodes, if the spray amount of dielectrics becomes too large, it sometimes is made difficult to apply a sufficient voltage to the electrode, by the edge effect of liquid dropping from the end face of the electrode. According to the dust collector of working example 3 of the present invention, a large amount of dielectrics can be sprayed, and a voltage of a sufficient magnitude can be applied between the grounding electrode and the voltage applying electrode, so that the dust collecting efficiency can be improved.

If the charged dust and the dielectrics are inserted from the downside of the grounding electrodes 40 and the voltage applying electrodes 41 of the aforesaid electric field forming means, and the dust and the dielectrics are moved perpendicularly to the electric lines E shown in FIG. 5, as shown in FIG. 7, a difference in rising velocity between the dielectrics and the dust is produced by the effect of gravity, so that the residence time of dielectrics in the electric field can be prolonged. As a result, the spray amount of dielectrics can be decreased, so that spark discharge occurring when the dielectrics collected on the grounding electrode 40 and the voltage applying electrode 41 drop can further be reduced, resulting in enhanced dust collecting efficiency.

In the above-mentioned working example 3, an example in which a d.c. voltage is applied to the voltage applying electrode of the electric field forming means to form an electric field has been described. However, even if an a.c. voltage is used in place of d.c. voltage, the same effect can be expected.

Also, an example in which the grounding electrode and the voltage applying electrode are in a cylindrical tube shape has been described. However, the shape of electrode is not limited to this, and an elongated shape of square tube, square column, circular column, etc. can be used.

WORKING EXAMPLE 4

$SO_3$ gas contained in exhaust gas generated when coal, heavy oil, etc. are burned was removed by using a dust collector shown in FIG. 8.

As shown in FIG. 8, the dust collector of working example 4 has charging means 51 provided on the left side of the collector body 50. This charging means 51 is configured in the same manner as described in the above-mentioned working example 1. A plurality of (for example, five) nozzles 52 are arranged as spraying means on the inlet side of the collector body 50. A demister 53 is arranged as collecting means on the outlet side of the collector body 50. A plurality of (for example, eight) demister cleaning nozzles 54 are arranged in front of the demister 53. Electric field forming means 55 is arranged between the nozzles 52 and the demister cleaning nozzles 54 in the collector body 50. This electric field forming means 55 has the same configuration as that described in the above-mentioned working example 1. A hopper 56 is formed under the collector body 50.

A first partition plate 57 is disposed in the hopper 56 so as to be positioned just under a space surrounded by the nozzles 52 and the electric field forming means 55. By forming the first partition plate 57 in the hopper in this manner, dielectrics sprayed from the nozzles 52 and treated gas can be prevented from being recovered in a circulating liquid storage tank, described later, by flowing along the inside surface of the hopper 56 without being carried to the electric field forming means 55. A second partition plate 58 is disposed in the hopper 56 so as to be positioned just under the demister 53. By forming the second partition plate 58 in this manner, the dielectrics always pass through the demister 53, and the cleaning liquid of the demister 53 can be recovered in the circulating liquid storage tank by flowing along the second partition plate 58 and the inside surface of the hopper 56. Although two partition plates are disposed in this working example, a plurality of partition plates can be disposed to prevent the gas from going through the hopper.

A tank 59 for storing a circulating liquid containing dielectrics is disposed at the lower end of the hopper 56. An alkali supply source 60 for supplying, for example, sodium hydroxide is connected to the tank 59 via a first solenoid valve 61. A pH indicating controller 62 is connected to the solenoid valve 61 at one end and to the storage tank 59 at the other end. This pH indicating controller 62 detects the pH of the circulating liquid in the tank 59. Thereupon, when the pH of the circulating liquid is lower than the target value, sodium hydroxide is supplied into the tank 59 by opening the solenoid valve 61, thereby keeping the pH of the circulating liquid at the target value. The pH value of the circulating liquid should preferably be 4 or more from the viewpoint of preventing corrosion of device caused by acid gas (for example, $SO_3$ gas) contained in the treated gas. Also, considering that acid toxic gas (for example, $SO_3$ gas) is absorbed by dielectrics, the pH value of the circulating liquid should preferably be 6 or more.

An industrial water supply source 63 is connected to the demister cleaning nozzles 54 via a second solenoid valve 64. An SS (suspended solid) concentration indicating controller 65 is connected to the solenoid valve 64 at one end and to the storage tank 59 at the other end. This SS concentration indicating controller 65 detects the concentration of suspended solid in the tank 59. Thereupon, when the concentration is higher than the target value, the amount of cleaning water sprayed from the demister cleaning nozzles 54 is increased, by which the circulating liquid in the tank 59 is diluted. Thereby, the concentration of the suspended solid is kept at the target value.

A pump 66 is connected to the nozzles 52 at one end and to the tank 59 at the other end. A solid-liquid separator 67 is installed in a pipe connecting the pump 66 with the tank 59. This solid-liquid separator 67 is sometimes installed to prevent the SS concentration of the circulating system from becoming too high when the drainage amount is restrained. As the concentration of suspended solid in the circulating liquid increases, the viscosity of the circulating liquid increases, so that a trouble of worn nozzle etc. may occur. A drain pipe 68 is connected to the pump 66.

In this dust collector, the aforesaid treated gas 69 is carried to the charging means 51, and the mist gas of the $SO_3$ gas is charged, for example, negative. This treated gas is carried to the nozzles 52 of the spraying means, and the circulating liquid containing sodium hydroxide aqueous solution, which is dielectrics, is sprayed from the nozzle 52 in a mist form or in a liquid drop form. By this spraying, the $SO_3$ gas in the treated gas can be absorbed by the dielectrics. From the viewpoint of increasing the efficiency of absorption of toxic gas by the dielectrics, the spray amount and pH of the dielectrics should be controlled in accordance with the load of gas absorbed by the dielectrics.

The dielectrics and the $SO_3$ mist are carried to the electric field forming means 55, the dielectrics are subjected to dielectric polarization, and the $SO_3$ mist is stuck to the dielectrics. By collecting the dielectrics by means of the demister 53 of the collecting means, $SO_3$ gas in exhaust gas could be removed. The strength (average electric field strength) of the electric field formed by the electric field forming means 55 was set at 5 kV/cm, for example.

The demister 53, which has collected the dielectrics that have arrested the $SO_3$ mist, is cleaned by the industrial water sprayed from the cleaning nozzles 54. The cleaning liquid flows along the partition plate 58 and the inside surface of the hopper 56 and is recovered in the storage tank 59. The circulating liquid in the storage tank 59 is sent to the pump 66 after its pH and suspended solid concentration are controlled to be the target values the pH indicating controller and the SS concentration indicating controller, respectively. Then, the circulating liquid is sprayed from the nozzles 52 of the spraying means.

WORKING EXAMPLE 5

As shown in FIG. 9, a dust collector of working example 5 has the same construction as that of the dust collector of working example 4 except that the collector has treated gas cooling means. A nozzle 70 of the treated gas cooling means is disposed at the inlet for the charging means 51. The nozzle 70 is connected to the pump 66. By this configuration, the circulating liquid in the storage tank 59 is used as cooling water for treated gas.

In this dust collector, the circulating liquid from the nozzle 70 of the cooling means is sprayed to the treated gas (for example, exhaust gas containing $SO_3$ gas, generated when coal, heavy oil, etc. are burned) 69, so that the gas is cooled, and the $SO_3$ gas is made mist. The $SO_3$ gas has a high dew point. If the treated gas is carried to the charging means 51 without being cooled, therefore, the gas is made mist on the downstream side of the charging means where the temperature is low. Thereupon, the gas is carried to the charging means 51 after being made mist in advance by the cooling means, the mist is charged, the circulating liquid containing sodium hydroxide aqueous solution, which is dielectrics, is sprayed, the dielectrics are subjected to dielectric polarization, the $SO_3$ mist is stuck to the dielectrics, and the dielectrics are collected by the demister 53 of the collecting means as in the case of working example 4, by which the removal percentage of $SO_3$ gas can be increased significantly.

In the above-mentioned working examples 4 and 5, the industrial water supply source is commonly used for cleaning the demister and for diluting the circulating liquid. However, separate industrial water supply sources may be used for cleaning the demister and for diluting the circulating liquid. Also, although an example in which a solid-liquid separator is provided has been described in working examples 4 and 5, the solid-liquid separator need not be used in some cases.

In the above-mentioned working examples 4 and 5, sodium hydroxide aqueous solution is used as the dielectrics. However, the dielectrics are not limited to this. For example, magnesium hydroxide ($Mg(OH)_2$) slurry or calcium hydroxide ($Ca(OH)_2$) aqueous solution may be used.

Although examples in which treated gas is moved as a horizontal flow have been described in working examples 4 and 5, the treated gas may be moved as a vertical flow.

WORKING EXAMPLE 6

Dust in a treated gas, for example, exhaust gas generated when coal, heavy oil, etc. are burned, was removed by using a dust collector configured as shown in FIG. 10. This dust collector uses charging means and spraying means having the same configuration as described in the above-mentioned working example 1.

As shown in FIG. 10, electric field forming means 80 comprises grounding electrodes 81a and 81b arranged a desired distance apart from each other, a voltage applying electrode 82 arranged between the grounding electrodes 81a and 81b so as to oppose to the left-side portions of the grounding electrodes 81a and 81b, and a d.c. power source 83 whose minus side is connected to the voltage applying electrode 82 and plus side is grounded. The two grounding electrodes 81a and 81b are grounded.

A non-conductive dielectrics holding member 84 of, for example, a V shape and a mesh form is arranged so as to close spaces between the grounding electrode 81a and the voltage applying electrode 82 and between the grounding electrode 81b and the voltage applying electrode 82 so that a treated gas always passes through the dielectrics. The dielectrics holding member 84 consists of, for example, polypropylene wire mesh housed in, for example, a V-shaped polypropylene cage.

Collecting means 85 for collecting re-scattered dielectrics has a discharge electrode 86 connected to a path branching off from an electric current path formed between the voltage applying electrode 82 and the d.c. power source 83. By this configuration, the portions opposing to the discharge electrode 86 of the two grounding electrodes 81a and 81b are used as an electric dust collector.

In this dust collector, dust 6 in the treated gas 5 is first charged, for example, negative by the charging means 1, and water, for example, is sprayed as dielectrics in a mist form to the dust by the spraying means 7. The dielectrics 8 and the dust 6 are carried to the electric field forming means 80. At the inlet for d.c. electric field (the average electric field strength is, for example, 5 kV/cm) formed by the electric field forming means 80, the dielectrics holding member 84 is arranged so that its portion opening in a V shape faces the outlet side. That is to say, the inlet is closed by the dielectrics holding member 84. The dielectrics 8 and the dust 6 enter the dielectrics holding member 84 from the directions of the arrow marks shown in the FIG. 10, so that the passing cross sectional area of dielectrics and dust can be made large, by which the travel velocity of dielectrics and dust passing through the dielectrics holding member 84 can be made sufficiently low. Also, the dielectrics subjected to dielectric polarization can arrest the charged dust in the electric field zone before entering the dielectrics holding member 84, and additionally the dielectrics holding member 84 can take in the dielectrics 8 having a larger particle diameter than that of the dust 6 by means of physical collision or static electricity force. Therefore, by an electric field formed between the dielectrics 8 of, for example, a liquid drop form held by the dielectrics holding member 84 and a substance (polypropylene in this case) forming the dielectrics holding member 84, the charged dust 6 can be arrested by the dielectrics 8 of a liquid drop form as shown in FIG. 11, or can be collected by the dielectrics holding member 84. Thereby, the dust collecting efficiency can be improved significantly.

If a liquid such as water and aqueous solution is used as the dielectrics 8 in this dust collector, the liquid drops held by the holding member 84 are combined with the liquid drops newly supplied to the holding member 84 to be enlarged and grow, so that the liquid drops flow down in the holding member 84 by gravity, and can be discharged to the outside of the system. Thereupon, if alkali aqueous solution is used as the liquid, the aforesaid toxic gas (for example, $SO_3$ gas) can be absorbed by the dielectrics, and the reuse of the dielectrics can be made possible.

Although an example in which polypropylene wire mesh housed in a V-shaped polypropylene cage is used as the dielectrics holding member 84 has been described in working example 6, the dielectrics holding member is not limited to this, and may be formed of a material that has a high opening percentage, a low draft loss, and water repellency such that the held dielectrics can keep their liquid drop form. The dielectrics holding member formed of such a material can include a member in which ceramic foam of, for example, a plate shape is arranged in a V shape.

Also, the opening percentage of the dielectrics holding member 84 should be 50% or more.

WORKING EXAMPLE 7

Dust in a treated gas, for example, exhaust gas generated when coal, heavy oil, etc. are burned, was removed by using a dust collector configured as shown in FIG. 12. This dust collector uses charging means and spraying means having the same configuration as that described in the above-mentioned working example 1.

A duct connecting with the outlet of the electric field portion was shaped into a rectangle, and a rectangular partition wall 90 shown in FIGS. 12 and 13 was disposed. The partition wall 90 has, for example, two circular holes 90a and 90b. Electric field forming means comprises a plurality of (for example, two) cylindrical tube shaped voltage applying electrodes 91a and 91b arranged at the center of the circular holes 90a and 90b, respectively, two cylindrical tube shaped and porous grounding electrodes 92a and 92b arranged at the periphery of the circular holes 90a and 90b, respectively, on the surface on the electric field portion side of the partition wall 90, and a d.c. power source 93. The two grounding electrodes 92a and 92b are made of stainless steel, for example, and grounded. For the d.c. power source 93, the minus side is connected to the two voltage applying electrodes 91a and 91b, and the plus side is grounded. According to this electric field forming means, by applying a d.c. voltage to the two voltage applying electrodes 91a and 91b by means of the d.c. power source 93, a d.c. electric field can be formed in a space surrounded by the voltage applying electrode 91a and the grounding electrode 92a and a space surrounded by the voltage applying electrode 91b and the grounding electrode 92b. The formed electric field is a nonuniform electric field.

A non-conductive first dielectrics holding member 94a of a cylindrical tube shape and of a mesh form is arranged concentrically with the grounding electrode 92a on the surface on the electric field portion side of the partition wall 90. On the other hand, a non-conductive second dielectrics holding member 94b of a cylindrical tube shape and of a mesh form is arranged concentrically with the grounding electrode 92b on the surface on the electric field portion side of the partition wall 90. Each of the first dielectrics holding member 94a and second dielectric holding member 94b consists of polypropylene wire mesh housed in a cylindrical tube shaped polypropylene cage. Also, the first dielectrics holding member 94a and the second dielectrics holding member 94b are formed with a cylindrical tube shaped reinforcing members 95a and 95b, respectively, on the inside surface thereof. These reinforcing members 95a and 95b, being porous and formed of a non-conductive material such as ceramics, play a role of keeping the shapes of the holding members 94a and 94b. By arranging the voltage applying electrodes, grounding electrodes, and dielectrics holding members in this manner, the grounding electrode and dielectrics holding member can be arranged concentrically with the voltage applying electrode. Circular partition plates 96a and 96b are arranged so as to close the opening on the electric field portion side of the dielectrics holding members 94a and 94b, respectively.

Collecting means for collecting re-scattered dielectrics comprises two cylindrical tube shaped grounding electrodes 97a and 97b arranged concentrically with the voltage applying electrodes 91a and 91b, respectively, on the surface on the duct side of the partition wall 90 and two sets of pricks 98a and 98b formed on the duct side of the voltage applying electrodes 91a and 91b, respectively. According to this collecting means, by applying a d.c. voltage to the voltage applying electrodes 91a and 91b by means of the d.c. power source 93, corona discharge can be allowed to take place between the prick 98a and the grounding electrode 97a and between the prick 98b and the grounding electrode 97b, so that the dielectrics rescattered from the holding members 94a and 94b can be collected on the principle of electric dust collector.

In this dust collector, dust 6 in the treated gas 5 is first charged, for example, negative by the charging means 1, and water, for example, is sprayed as dielectrics in a mist form to the dust by the spraying means 7. The dielectrics 8 and the dust 6 are carried to the electric field forming means. Since the partition plates 96a and 96b are formed, the dielectrics 8 and the dust 6 enter a d.c. electric field (the average electric field strength is 5 kV/cm, for example) formed by the aforesaid electric field forming means from the directions along the arrow marks shown in FIG. 12, pass through the grounding electrode 92a, 92b, and move in the holding member 94a, 94b at a relatively low velocity. By the above-mentioned arrangement of the partition plates 96a and 96b, the holding members 94a and 94b are arranged so as to close the inlet for the d.c. electric field. Therefore, the holding members 94a and 94b can have a large passing cross sectional area of dielectrics. Thereupon, the residence time of the dielectrics 8 and the dust 6 in the d.c. electric field can be prolonged, so that the dust collecting efficiency can be improved.

The holding members 94a and 94b can collect most of the dielectrics 8, and also have a function as mechanical collecting means such as a demister. However, the enlarged and aggregated dielectrics 8 are sometimes re-scattered from the holding members 94a and 94b. Such dielectrics 8 can easily be collected by the re-scattered dielectrics collecting means.

Although an example in which polypropylene wire mesh housed in a cylindrical tube shaped polypropylene cage is used as the dielectrics holding member 94a, 94b has been described in working example 7, the dielectrics holding member is not limited to this, and may be formed of a material that has a high opening percentage, a low draft loss, and water repellency such that the held dielectrics can keep their shape. The dielectrics holding member formed of such a material can include a member in which ceramic foam of, for example, a cylindrical shape is arranged.

Also the opening percentage of the dielectrics holding member 94a, 94b should be 50% or more.

Although examples in which dust or mist in the treated gas is charged negative by the charging means have been described in the above-mentioned working examples 1 to 7, the dust or mist may be charged positive.

Also, the aforesaid water or aqueous solution or water-containing slurry may be used as the dielectrics. When the exhaust gas contains an acid gas such as $SO_3$ gas, alkali aqueous solution, such as sodium hydroxide aqueous solution and calcium hydroxide aqueous solution, and alkaline slurry such as slurry containing magnesium hydroxide should be used as the dielectrics.

The dielectrics should preferably be sprayed in a mist or liquid drop form to the charged dust. The average particle diameter of the dielectrics in such a mist or liquid drop form should preferably be in the range of 50 $\mu$m to 5 mm. The reason for this is as follows: If the average particle diameter is less than 50 $\mu$m, it is possibly difficult to collect the dielectrics, which have arrested dust, by means of the mechanical collecting means such as a demister. On the other hand, if the average particle diameter exceeds 5 mm, the supply amount of dielectrics must be increased, so that there is a possibility of occurrence of the aforesaid spark discharge when parallel plate electrodes are used as the electric field forming means.

A higher strength of electric field formed by the electric field forming means is preferable because the amount of electric charge on the surface of dielectrics developed by dielectric polarization increases.

According to a dust collector in accordance with the present invention, the dust and/or mist contained in a gas is charged positive (+) or negative (–) by the charging means. Charged dust or mist is sprayed or dielectrics are sprayed to the charged dust or mist by the spraying means. The dielectrics are subjected to dielectric polarization by the electric field forming means. If the dielectrics are subjected to dielectric polarization in such a manner, the polarization charge of dielectrics and the charge of dust or mist charged by the charging means are attracted to each other, or the Coulomb force is exerted by the electric field formed between the dielectrics, so that the dust or mist can be arrested by the dielectrics. The dielectrics that have arrested at least either of dust and mist can be collected by a small electrode area when an electric dust collector is used as the collecting means because of its large particle diameter, and also can easily be collected even by a mechanical dust collector, such as a demister, using collision dust collection (inertia dust collection). Therefore it is necessary only that the dust or mist is moved a distance necessary for being arrested by the dielectrics, so that the travel distance of dust or mist can be decreased. Thereupon, the collecting efficiency of fine dust or mist that has difficulty being collected by the conventional electric dust collector, especially particles with a submicron particle diameter, can be increased greatly.

Another dust collector in accordance with the present invention comprises cooling means for cooling a gas and making the gas to be removed of the aforesaid gas mist, charging means for charging said mist, spraying means for spraying dielectrics to the charged mist, electric field forming means for forming an electric field for subjecting the dielectrics to dielectric polarization, and collecting means for collecting the dielectrics that have arrested the charged mist. According to this collector, the gas to be removed can be made mist before being charged, so that the removal percentage of a gas, which has a high dew point, that is, which is less prone to be made mist, contained in the gas can be increased. Since $SO_3$ gas, one of toxic gases contained in the exhaust gas from, for example, a desulfurizer, has a high dew point, the removal percentage of $SO_3$ gas in the exhaust gas can be increased by removing the $SO_3$ gas by using the dust collector in accordance with the present invention.

Also, by using means having parallel plate electrodes for forming a d.c. electric field or alternating electric field as the electric field forming means in the above-described two collectors, a uniform electric field can be formed, so that the dielectrics are only subjected to dielectric polarization, and not collected by the static electricity force, by which the rate of dielectrics in the space can be kept uniform. As a result, the dust collecting efficiency can be increased.

Further, as the electric field forming means in the above-described two collectors, a plurality of grounding electrodes and voltage applying electrodes are provided to form a d.c. electric field or alternating electric field, the grounding electrodes and the voltage applying electrodes are erected adjacently, the lower part of the grounding electrode is covered with a cover having the same electric potential as that of the electrode, and the lower part of the voltage applying electrode is covered with a cover having the same electric potential as that of the electrode, by which dust that has been charged in the electric field formed by the electric field forming means and dielectrics that have arrested mist are collected on the grounding electrodes and the voltage applying electrodes, and drop along the electrodes by gravity. Since the strength of electric field formed at the lower part of the grounding electrodes and the voltage applying electrodes is weakened by the cover, a phenomenon that the dropped dielectrics are charged inversely and go toward the opposing electrode can be prevented, and the voltage applied to the voltage applying electrode can be prevented from being decreased. Consequently, the spray amount of the dielectrics can be increased, and the distance between the charged dust or mist and the dielectrics can be decreased, so that the dust collecting efficiency can be improved.

The word "erect" described here includes to position in an inclined state as well as to position upright or substantially upright. Also, the arrangement in which the grounding electrodes and the voltage applying electrodes are erected adjacently includes arrangement in which the voltage applying electrodes are arranged at four sides of the grounding electrode, and arrangement in which the grounding electrodes are arranged at four sides of the voltage applying electrode and the voltage applying electrodes are arranged at four sides of the grounding electrode, in addition to the above-mentioned arrangement in which the grounding electrodes are arranged at four sides of the voltage applying electrode.

Still another dust collector in accordance with the present invention, which is a dust collector for removing dust and/or mist contained in a gas, comprises charging means for charging dust and/or mist contained in a gas, spraying means for spraying the charged dust or charged mist or spraying dielectrics to the charged dust or mist, electric field forming means for forming an electric field for subjecting the dielectrics to dielectric polarization, and a porous or mesh-form, non-conductive dielectrics holding member arranged in the electric field so as to block the travel path of the dielectrics. According to this dust collector, the velocity at which the dielectrics move in the electric field and the dielectrics holding member can be decreased, so that the residence time of the dielectrics in the electric field can be prolonged. Also, the holding member can take in the dielectrics, so that the dust or mist charged by the electric field between the dielectrics and the holding member can be arrested by the holding member. Therefore, the charged dust or mist can be arrested by the dielectrics that are subjected to dielectric polarization and exist outside the holding member, and also can be arrested in the holding member, so that the dust collecting efficiency can be improved significantly.

In particular, by arranging the holding member so as to block the inlet for the electric field, the velocity at which the dielectrics move in the electric field can further be decreased, and the dielectrics passing cross sectional area of the holding member can be increased, so that the dust collecting efficiency can be increased dramatically.

As described above, the present invention provides a dust collector which can efficiently collect dust and mist, especially fine dust and mist (submicron particles) that has difficulty being collected by the conventional dust collector.

We claim:

1. A dust collector for removing at least one of dust and mist from a gas, comprising:

a charger for electrically charging at least one of dust and mist contained in a gas;

a sprayer without charging means therein, located apart and downstream from the charger in a flow of the gas that sprays an uncharged dielectric material to at least one of charged dust and charged mist;

an electric field former that forms an electric field which subjects said uncharged dielectric material to dielectric polarization; and a collector for collecting said dielectric material which has arrested at least one of charged dust and charged mist.

2. A dust collector according to claim 1, wherein said electric field former has parallel plate electrodes for forming at least one of a d.c. electric field and an alternating electric field.

3. A dust collector according to claim 1, wherein said collector comprises at least one of an electric dust collector and a mechanical dust collector.

4. A dust collector according to claim 1, wherein said electric field former has a plurality of grounding electrodes and voltage applying electrodes for forming at least one of a d.c. electric field and an alternating electric field, said grounding electrodes are adjacent said voltage applying electrodes, the lower part of said grounding electrode is covered with a cover having the same electric potential as that of the grounding electrode, and the lower part of said voltage applying electrode is covered with a cover having the same electric potential as that of the voltage applying electrode.

5. A dust collector comprising:

a cooler for cooling a gas to form a mist of a gas component to be removed from said gas;

a charger for electrically charging said mist;

a sprayer without charging means therein, located apart and downstream from the charger in a flow of the gas that sprays an uncharged dielectric material to the charged mist;

an electric field former that forms an electric field which subjects said uncharged dielectric material to dielectric polarization; and a collector for collecting said dielectric material which has arrested the charged mist.

6. A dust collector according to claim 5, wherein said electric field former has parallel plate electrodes for forming at least one of a d.c. electric field and an alternating electric field.

7. A dust collector according to claim 5, wherein said collector comprises at least one of an electric dust collector and a mechanical dust collector.

8. A dust collector according to claim 5, wherein said electric field former has a plurality of grounding electrodes and voltage applying electrodes for forming at least one of a d.c. electric field and an alternating electric field, said grounding electrodes are adjacent said voltage applying electrodes, the lower part of said grounding electrode is covered with a cover having the same electric potential as that of the grounding electrode, and the lower part of said voltage applying electrode is covered with a cover having the same electric potential as that of the voltage applying electrode.

9. A dust collector for removing at least one of a dust and a mist from a gas, comprising:

a charger for electrically charging at least one of dust and mist contained in a gas;

a sprayer without charging means therein, located apart and downstream from the charger in a flow of the gas that sprays an uncharged dielectric material to at least one of the charged dust and the charged mist;

an electric field former that forms an electric field which subjects said uncharged dielectric material to dielectric polarization; and a porous, non-conductive member for holding the dielectric material, said member being arranged to block the travel path of said dielectric material in said electric field.

10. A dust collector according to claim 9, wherein said dielectric material holding member is arranged in said electric field to block an inlet of said electric field.

11. A dust collector according to claim 9, wherein said porous, non-conductive member is a mesh-form non-conductive member.

* * * * *